May 12, 1970

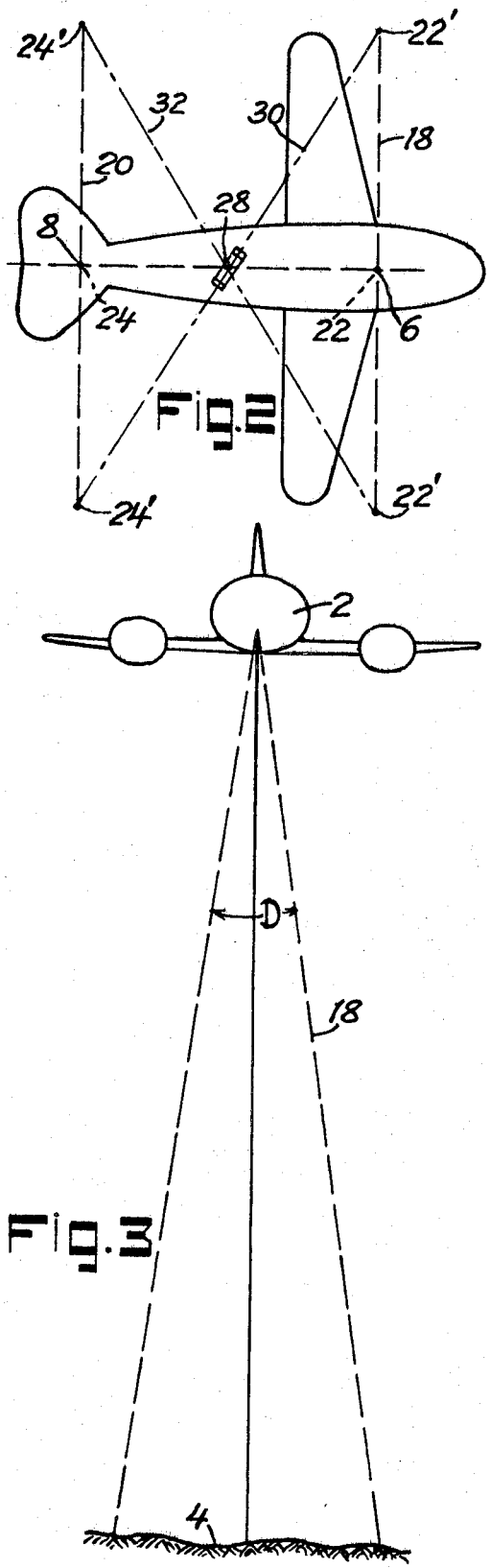
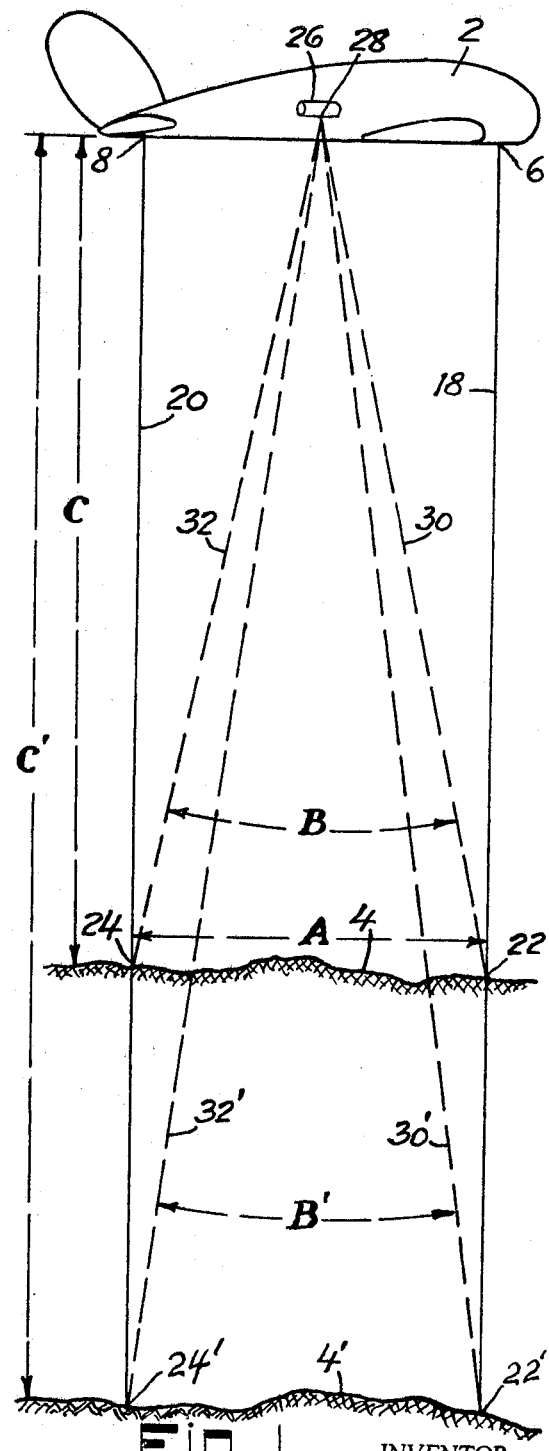
Fig. 2
Fig. 3
Fig. 1.
INVENTOR.
CHARLES F. LEHR
BY Sperry and Zoda
ATTORNEY

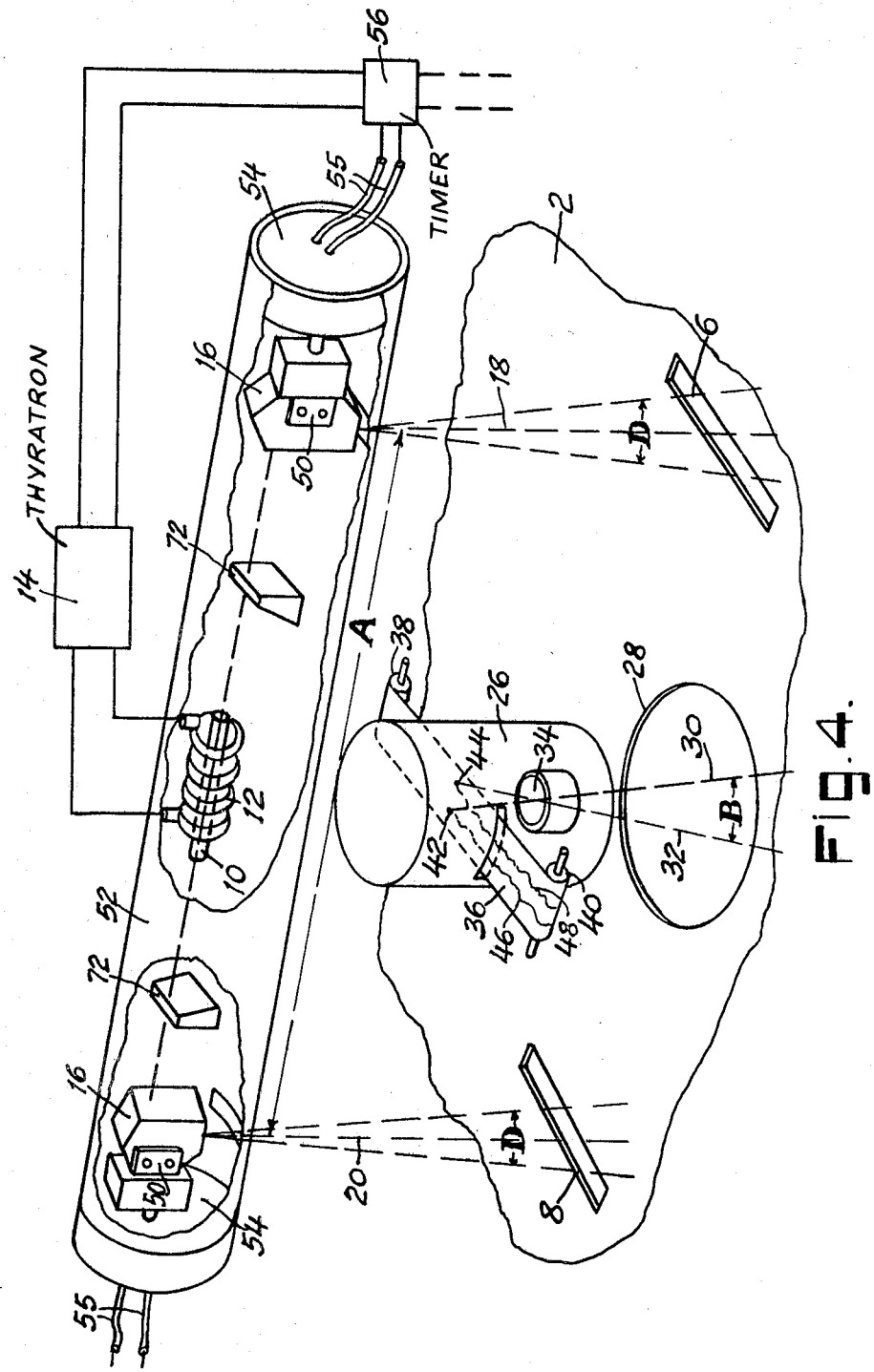

C. F. LEHR 3,511,927

AERIAL PHOTOGRAMMETRY SYSTEM EMPLOYING DUAL LIGHT BEAMS

Filed Sept. 13, 1965

INVENTOR.
CHARLES F. LEHR
BY
Sperry and Zoda
ATTORNEY

United States Patent Office 3,511,927
Patented May 12, 1970

3,511,927
AERIAL PHOTOGRAMMETRY SYSTEM EMPLOYING DUAL LIGHT BEAMS
Charles F. Lehr, 204 Hamilton Ave.,
Princeton, N.J. 08540
Filed Sept. 13, 1965, Ser. No. 486,843
Int. Cl. H04n 7/00, 9/60
U.S. Cl. 178—6.5
14 Claims

ABSTRACT OF THE DISCLOSURE

Equipment for recording variations in terrain over which an aircraft flies wherein two spaced beams of light are projected downwardly from the aircraft onto the terrain and changes in the relative angular relation of reflections of the light from the terrain are utilized to indicate the elevation of the aircraft with respect to the terrain.

---

Invention relates to photographic methods and means for use in photogrammetry or photogeometrics and is directed particularly to methods and equipment whereby the topographical mapping can be carried out more rapidly and by the use of relatively simple and economical means.

It has been usual practice heretofore to employ various types or aerial cameras for scanning the terrain over which an aircraft is flow to produce stereo-photographs of the area to be mapped. These photographs are then utilized in stereo-plotting equipment to produce a topographical map. However, the cameras and plotting equipment are expensive and must be of very high precision, whereas the speed and accuracy with which a map can be produced in this manner is largely dependent upon the skill, experience, and "stereoscopic vision" of the operator using the plotting equipment.

In accordance with the present invention, these objections and limitations in photogrammetric and photogeometric methods and means of the prior art are reduced or overcome and novel and simplified equipment and procedures are provided whereby the production of topographical maps or other measurements can be made and recorded at high speed and in a manner which substantially eliminates human error.

These advantages are preferably attained by projecting two beams of light, such as laser beams, downward from spaced points on a scanning aircraft to the ground, and recording the position of such beams of light when reflected from the ground onto a photographic film through an optical system located at a predetermined distance from the spaced points from which the light or laser beams were emitted. In this way, variations in the distance of the aircraft from the points on the ground from which the light or laser beams are reflected, will result in variations in the angle between such reflected beams and the space between the points on the photographic film to which the reflected beams are directed. Accordingly, by flying aircraft carrying such equipment at a constant level and over parallel paths above the surface to be mapped, a large area may be scanned and a complete and accurate record can be obtained indicating variations in the terrain. The record thus obtained then may be used to produce topographical maps quickly and easily and without the use of stereo-plotting equipment. Moreover, the absence of chromatic diffusion and dispersion which characterized laser and other monochromatic light beams, enables such light to penetrate clouds and other atmospheric barriers most effectively. As a result, it is possible to carry out mapping operations in accordance with the present invention under conditions which have heretofore precluded or impaired the use of prior scanning equipment.

Accordingly, the principal objects of the present invention are to increase the accuracy and simplify the scanning equipment used in producing topographical maps; to eliminate the use of stereoptical equipment and human errors heretofore used and occurring in the interpretation of photographs obtained in scanning and mapping operations; to provide novel means for recording variations in contour of the ground over which an aircraft is flown; to utilize an optical system for recording the angle between emitted and reflected rays of light with respect to an aircraft; and to provide novel optical systems for use in recording variations in a surface over which an aircraft travels.

These and other objects and features of the present invention will appear from the following description thereof wherein reference is made to the figures of the accompanying drawings.

In the drawings:

FIG. 1 is a diagrammatic illustration of a typical embodiment of the present invention as applied to an aircraft;

FIG. 2 is a plan view of the aircraft illustrated in FIG. 1;

FIG. 3 is a diagrammatic front view of the aircraft illustrated in FIG. 1;

FIG. 4 is a perspective illustrating typical equipment which may be used in accordance with the present invention;

Figure 5:
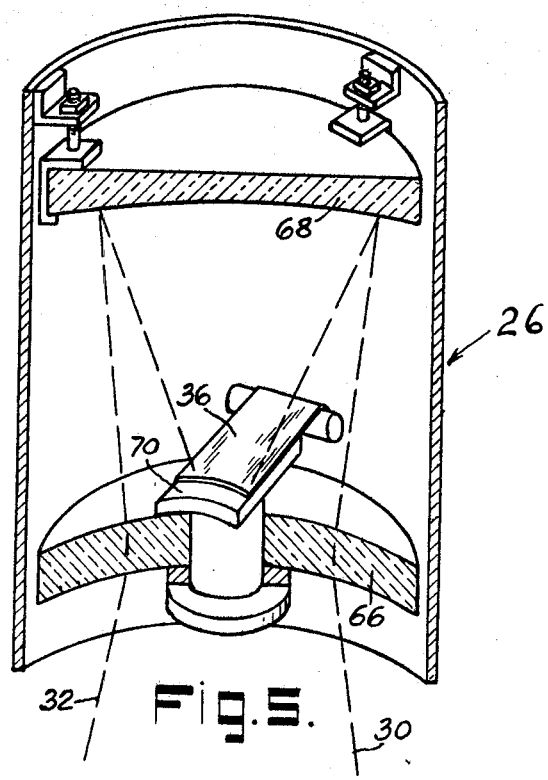
FIG. 5 is a vertical sectional view illustrating a typical optical system which may be embodied in equipment in accordance with the present invention.

In that form of the invention chosen for purposes of illustration in the figures of the drawings, the equipment is carried by an aeroplane 2 adapted to be flown at a constant elevation and in parallel lines over the surface of the ground 4 for scanning the terrain to be mapped. Two spaced sources of light are carried by the aeroplane and may be located at points near the nose and tail of the plane as indicated at 6 and 8. These light sources are preferably of a monochromatic type and ideally are sources of laser beams of light derived in a conventional or suitable manner from a ruby crystal 10 or the like under the influence of suitable exciting and control means as indicated generally in FIG. 4. Such a crystal may have polished ends which have been thinly coated with reflecting material which will pass bursts of collimated light during periods of suitable excitation. The excitation may be effected by employing an adjacent gas discharge tube 12 coupled with a conventional electrical power and triggering means 14 such as a thyratron system whose electrical characteristics are such as to provide a uniform discharge of current to maintain the pumping energy above the threshold level of the laser for predetermined intermittent periods. The light thus generated is caused to pass through penta prisms 16 or the like so as to be directed downwardly at a precise angle to the laser axis from the spaced points 6 and 8 of the aircraft 2 in the form of beams 18 and 20.

In the diagrammatic embodiment of the invention illustrated in FIG. 1, the beams 18 and 20 are projected downwardly in parallel relation to each other to points 22 and 24 on the ground 4 beneath the aircraft. Optical means carried by the aircraft and indicated generally at 26 are mounted in a suitable location such as the point 28 positioned midway between the points 6 and 8 from which the light beams 18 and 20 are projected. The optical means are thus positioned to receive light reflected from the points 22 and 24 on the ground in the form of the rays or reflected beams of light indicated at 30 and 32. The horizontal distance A between the points 6 and 8 on the ground 4 resulting from the projection of parallel beams 18 and 20 downward from the aeroplane, will, of course, remain constant independently of the altitude or distance of the aircraft from the ground 4. However, the angle B between the reflected beams of light 30 and 32 will vary in response to variations in the attitude or distance C of the aircraft, and the optical means or point 28, from the ground. Thus, as shown in FIG. 1, if the aircraft should be at an altitude C' from the ground at 4', the reflected beams of light 30' and 32' will be disposed at an angle B' with respect to each other. Therefore, the magnitude of the angles B and B' provides an accurate indication of the altitude or distance of the aircraft from the ground. Accordingly, if the aircraft is flown on a level course, variations in the angle B between the reflected beams of light will provide an accurate indication of variations in the level of the terrain beneath the aircraft.

As shown in FIGS. 4 and 5, the optical means 26 may embody a lens system 34 through which the reflected beams of light 30 and 32 pass to recording means such as a photographic film 36. The film 36 preferably is mounted on rollers 38 and 40 which are driven by suitable means (not shown) so as to be movable past the focal plane of the lens 34 in position to have the reflected beams 30 and 32 projected thereon at the points 42 and 44. The distance between the points 42 and 44 will then vary upon variation in the angle B and the elevation of the terrain over which the aircraft is flown. At the same time, movement of the film will serve to cause the light beams to describe pairs of lines on the film 36 which will be spaced apart at any point throughout the length of the lines a distance corresponding to the distance or elevation of the terrain 4–4' beneath the aircraft.

As shown by way of illustration in FIG. 4, the record thus obtained will consist of a pair of lines 46 and 48 which vary in their spacing as the elevation of the terrain varies. Any particular pair of points on the lines 46 and 48, such as the points 42 and 44, will indicate the elevation of the terrain when the aircraft was over a specific point in the terrain whereby the record obtained and consisting of the lines 46 and 48 on the film 36 may be utilized to produce a topographical map of the utmost accuracy.

Since the record obtained as described above would afford an indication of the topography in only a single narrow path beneath the aircraft, it would be necessary to scan the terrain in a multitude of closely adjacent paths in order to obtain sufficient records to produce a complete topographical map of an extended area. Therefore, it is preferable to provide means for scanning an extended area beneath the aircraft on each passage thereof over the terrain. For this purpose, means are provided for rotating or otherwise moving the scanning beams of light transversely of the path of flight from the points 22 and 24 to the points 22' and 24' as indicated in FIGS. 1 and 2.

Typical means which may be employed for this purpose are shown in FIG. 4 wherein the prisms 16 are mounted in holders 50 connected by a tube 52. Two selsyn motors 54 or other suitable means are supported by the tube 52 and to prism holders 50 to rotate the prisms about a common axis passing through the ruby crystal 10. The selsyn motors 54 are connected by conductors 55 to a power and triggering means 14 which are preferably included in a circuit under control of a timing device 56 so as to synchronize the operation thereof and cause the laser or light source 10 to fire or be actuated intermittently and while the prisms 16 are moving through a limited arc of rotation represented by the angle D. In a typical operation, the prisms 16 may rotate at say 1600 r.p.m. and the laser is fired during only a portion of the arc of each revolution under control of a thyratron system synchronized to the selsyn motor excitation. The triggering means for the laser includes a network to control a capacitor discharge rate at a uniform level above the threshold level of the laser for a time period that will permit the prisms to span the desired angle of the surface being scanned.

Figure 6:
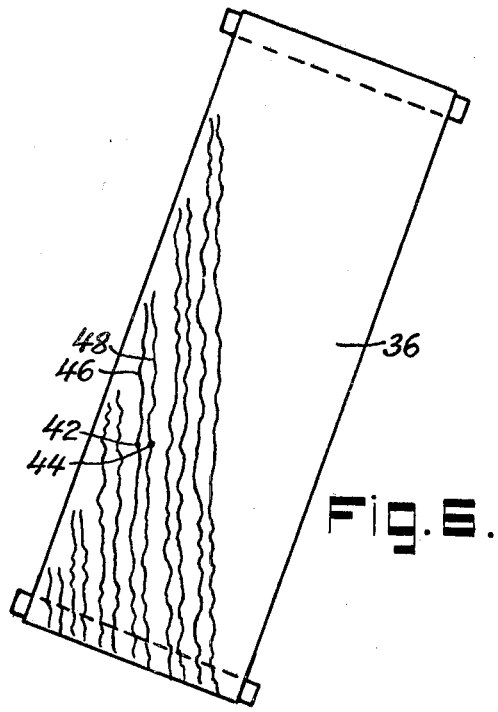
FIG. 6 is a plan view of one form of record which may be obtained in the practice of the present invention.

In this way, the beams of light 18 and 20 will sweep transversely across the path of flight of the aircraft through the predetermined angle D so that as shown in FIG. 6, a plurality of adjacent pairs of lines 46 and 48 will be produced on the film 36 as the film is advanced. The film which is located at the focal point of the optical system, may be moved diagonally with respect to the reflected beams of light, if desired, to produce a record as shown in FIG. 6 whereby a longer scan can be produced on a narrow film. This record then will indicate variations in the terrain beneath the aircraft throughout a plurality of adjacent transversely extending bands or areas of the terrain over which the parallel beams of light 18 and 20 are caused to sweep transversely of the direction of flight. Each pair of lines 46 and 48 on the film or record 36 will then serve to record the characteristics of a different transversely extending area or zone scanned by the transversely moving beams of light.

In this way, a complete record of the topography of the terrain in a relatively wide strip extending in the direction of the line of flight of the aircraft can be obtained and an extended expanse of territory can be mapped by parallel passes of an aircraft carrying the equipment thereover. The record thus produced can be utilized in various ways to translate the spaced lines 46 and 48 into contour lines on a topographic map. The translating means may be of any suitable data plotting type.

In order to maintain the desired accuracy in producing records in accordance with the present invention, the optical means 26 may be of the type shown in FIG. 5. As there illustrated, the lens 66 may be of very high relative aperture and cooperate with mirror 68 to attain the maximum resolution of surface detail in the photographic image produced on the film 62. Slower films having a relatively fine grain can then be employed because of the greater amount of light available. As shown, a Maksutov or Schmidt lens system or any suitable combination of lenses having the desired aperture and correction of optical aberrations may be used. While such lenses and systems have the disadvantage of a sharply curved image field, this difficulty may be overcome in accordance with the present invention by providing a convex transversely extending film supporting member or sheath 70 engageable by the film 36. The film is thus supported so as to remain in focus with respect to the mirror 68 as the angle at which the reflected beams are received by the optical system is varied and the film is moved lengthwise of the transversely convex support 70. The movement of the film 36 lengthwise of the transversely convex support 70 is preferably synchronized with the operation of the laser and the rotation of the pentaprisms 16. The convex film support 70 and the movement of the film 36 are preferably disposed at an angle to the direction of movement of the reflected beams of light relative to the film so that the recorded lines 46 and 48 on the film will be inclined or transverse of the film as illustrated in FIG. 6 so as to permit a longer scan on a narrow film. In this way it is possible to permit a greater amount of light passing through lens 66 to reach mirror 68. Accurate focusing of the ground reflected light beams 30 and 32 on the film 36 as the emitted beams 18 and 20 sweep transversely across the terrain is thereby assured and will be recorded on the film as pairs of transversely extending lines.

While the system described above and as shown in the drawings makes use of lasers or beams of monochromatic light which are projected downwardly from the aircraft in parallel relation, such beams, may in the alternative be projected downwardly at either a diverging or a converging angle with respect to each other. Thus as shown in FIG. 4, optical wedges 72 may be located between the light sources 10 and penta-prisms 16 to cause the projected rays to converge and be reflected from the ground at suitable angles to an optical system located between the points on the aircraft from which the projected rays merge. In such cases, the point at which the projected beams of light would intersect is preferably more remote from the aircraft than the ground since the reflected beams and the lines formed thereby on the film might otherwise cross and render the reading or translation of the record difficult.

In each of the embodiments of the invention described above, it is preferable to employ lasers or other monochromatic light and, if desired, an optical filter may be provided to eliminate undesired light rays or those of a materially different wave length from influencing the record obtained. Moreover, the film employed may be chosen to be selective or most highly sensitive to the wave length of the light source used or produced by the laser whereby the film will be exposed and a record produced only by light of the chosen wavelength.

One of the distinct advantages of the present invention resides in the fact that the scanning and plotting of relatively flat surfaces from which reflection takes place will be accurately indicated on the records produced whereas the scanning and plotting of such surfaces by stereo-optical photographs is frequently difficult because of the very limited contrast or shadow effects presented in the absence of hills and valleys or roughness in the surface being photographed.

The present invention also serves to produce a record which may be read and understood directly, without actually producing a complete map, since the spacing of the lines 46 and 48 in a record such as that illustrated in FIG. 6, will give a direct indication of the presence of hills and valleys for interpretation by persons having but little experience in map making.

While it is considered preferable to use a single laser or light source from which light is directed to penta-prisms for projection to the ground beneath the aircraft, two separate light sources or lasers may be used and synchronized for scanning. It is also possible to use mirrors or other light directing means in place of penta-prisms and the lights may be emitted directly from the light sources to the ground if desired.

Furthermore, it is possible and desirable in some applications of the equipment of the present invention to employ it simply as an altimeter in which case light sources spaced from an optical system or ground glass screen to which light is reflected from the ground can replace the film and provide a direct and instantaneous indication of the height of aircraft above the surface over which it is flying. Numerous other applications of the invention are possible and will be evident to those skilled in the art of photogrammetry and photogeometrics.

It will thus be apparent that equipment and methods employed in the practice of the present invention are capable of numerous variations and changes in the form, construction and operation thereof. It should, therefore, be understood that the particular embodiments of the invention shown in the drawing and described above are intended to be illustrative only and are not intended to limit the scope of the invention.

I claim:

1. Equipment for use in recording variations in the terrain beneath an aircraft comprising light emitting means located at spaced points on the aircraft, means for directing light from said emitting means downwardly in the form of spaced beams projecting in predetermined relative directions with respect to each other and toward two points on the ground beneath the aircraft, optical means on said aircraft spaced from said light emitting means and positioned to receive light reflected from said points on the ground, said optical means being formed to direct such reflected light onto a light sensitive film, and means for moving a light sensitive film past said optical means in position to record the angular positions of said points on the ground with respect to each other as the aircraft moves over said terrain.

2. Equipment as defined in claim 1 wherein said light emitting means includes at least one laser.

3. Equipment as defined in claim 1 wherein the beams of light from said light emitting means are directed downwardly in spaced parallel relation.

4. Equipment as defined in claim 1 wherein said light emitting means are located in the line of flight of said aircraft.

5. Equipment as defined in claim 1 wherein means are provided for moving said beams of light in a direction transverse to the line of flight of said aircraft.

6. Equipment for recording variations in the terrain over which an aircraft is flying comprising a laser, two light directing elements carried by said aircraft and located at spaced points lengthwise of the aircraft, said light directing elements being positioned to receive light from said laser and direct spaced beams of light downwardly in predetermined relative directions with respect to each other from the aircraft to the terrain over which it is flying, an optical system spaced from said light directing means in position to receive beams of light reflected at an angle from said terrain to said optical means; said optical means including a photographic film for recording variations in the angle at which said reflected beams of light are received by said optical means.

7. Equipment as defined in claim 6 wherein means are provided for moving said light directing means to cause the beams of light issuing therefore to move transversely of the line of flight of the aircraft.

8. Equipment as defined in claim 7 wherein said optical system includes a mirror, an elongated film support positioned at the focus of the optical system to receive a film and hold it in a convex form wherein it will receive accurately focused images from said mirror, and means for moving a film longitudinally of said convex film support.

9. Equipment as defined in claim 7 wherein means are provided for synchronizing the operation of said laser and the means for moving said light directing means.

10. Equipment as defined in claim 8 wherein means are provided for synchronizing the operation of said laser, the means for moving said light directing means and the movement of said film.

11. Equipment as defined in claim 8 wherein said elongated film support and the film moving thereover are disposed at an angle to the direction of movement of reflected beams of light relative to said film.

12. A record for use in producing a topographical map comprising a film having a plurality of pairs of lines extending transversely thereof, the spacing between said pairs of lines at any point throughout the length of said lines varying to correspond to the vertical distance of terrain below an aircraft flying above said terrain.

13. The method of producing a record for use in developing a topographical map which comprises the steps of projecting two beams of light disposed in predetermined relative directions with respect to each other downward from spaced points on an aircraft flying at a constant level above the terrain to be mapped, and focusing on a record carried by the aircraft and spaced from said points beams of light reflected from the ground from those points on which said beams of light are reflected.

14. The method as defined in claim 13 wherein the beams of light projected downward from the aircraft are disposed in parallel relation and directed onto spaced points on the ground over which the aircraft is flown.

References Cited
UNITED STATES PATENTS

| | | | |
|---|---|---|---|
| 2,949,055 | 8/1960 | Blackstone | 178—6.5 |
| 3,316,348 | 4/1967 | Hufnagel | 178—6.7 |

ROBERT L. GRIFFIN, Primary Examiner

H. W. BRITTON, Assistant Examiner

U.S. Cl. X.R.

178—6.7